United States Patent Office 2,824,040
Patented Feb. 18, 1958

2,824,040

FUMIGANT COMPOSITION COMPRISING PETROLEUM ETHER AS A FLAMMABILITY DEPRESSANT AND METHOD OF PREPARING SAME

Edward J. Stanko, Mayfield Heights, and William J. Esselstyn, Painesville, Ohio, assignors to Diamond Alkali Company, Cleveland, Ohio, a corporation of Delaware No Drawing. Application February 25, 1954
Serial No. 412,654

9 Claims. (Cl. 167—39)

This invention relates to new and useful insecticides and more particularly relates to improvements in grain fumigants and to a method for fumigating insect-infested grain and similar substances.

The control of weevils, bran bugs, and related insect pests is a problem of major importance in the storage of grain, seeds, and similar food materials. In practice, such stored grain is frequently held in bins or elevators for extended periods of time and if untreated, may become so badly infested with insects as to be of little value.

While a variety of organic compounds has been suggested heretofore and used commercially as grain fumigants, the problem of controlling insect infestation of grain remains a serious one. One of the difficulties in many prior fumigant materials has been their high flammability as evidenced by their low flash points. For example, while carbon disulfide used alone would be an excellent fumigant, as far as its fumigating qualities are concerned, its use is highly impracticable because of its high flammability. Accordingly, in practice, it has been necessary heretofore to so formulate an insecticide as to provide a reasonably safe material from the standpoint of fire hazard.

It is, therefore, a principal object of the present invention to provide new and improved grain fumigants which are exceedingly toxic to insect life, even in low concentrations, and which are also characterized by low flammability, as evidenced by their high flash points or lack of flash points.

It is a further object of the present invention to provide a new and improved fumigant composition and the method for its use.

A still further object is the provision of grain fumigants which do not undesirably affect the material treated therewith and which, in the concentrations employed, will have substantially no deleterious effects on storage containers and related equipment with which it may come in contact.

Another object is the provision of an insecticide composition which can be produced from readily available raw materials in a simple manner and which may be applied to stored grain, seeds, or other similar food products by sprinkling, pouring, or otherwise distributing the fumigant over and through the stored material.

These and other objects and advantages of the present invention will appear more fully from the following description.

According to the present invention, improved insecticide compositions, particularly useful as grain fumigants, are provided by a mixture comprising carbon tetrachloride, carbon disulfide, sulfur dioxide, and petroleum ether. In some instances it is possible to employ a mixture containing no sulfur dioxide. Superior results are obtained using a mixture comprising carbon tetrachloride as a major constituent and lesser amounts of carbon disulfide, sulfur dioxide, and petroleum ether. As will be set forth in more detail hereinafter, such a synergistic composition is not only characterized by low flammability or lack of flammability but also an extremely high insect killing power even in low concentrations.

The constituents of the foregoing composition may be the chemically pure compounds or, if desired, such materials as are available commercially. The expression "petroleum ether," as used herein, is intended to include such materials falling within the definition set forth in Hackh's Chemical Dictionary, third edition, page 635, wherein petroleum ether is described as a mixture of $C_5$ and $C_6$ hydrocarbons, the mixture having a boiling point range of approximately 40° to 60° C.

While the proportions of the various ingredients may be varied in particular applications, it is generally desirable to employ a mixture containing at least 78 to 80 parts by volume of carbon tetrachloride and no more than about 20 to 22 parts by volume of carbon disulfide. The sulfur dioxide is readily incorporated by dissolving $SO_2$ in the carbon tetrachloride-carbon disulfide-petroleum ether mixture in a small but effective amount, which generally may be about 0.5% to 1.5% by weight of the mixture. The amount of petroleum ether to be employed also is determined by the particular application intended, a typically practicable amount being up to about 3% by volume of the other materials in the mixture.

At present, it is not clearly understood just why the addition of a small amount of petroleum ether to the foregoing binary or ternary mixture produces such an effective fumigant having an extremely high flash point or complete lack of flash point. However, by way of theory, which is not to be construed as limiting the present invention in any way, it is believed that the petroleum ether exhibits a singular chemical affinity in a binary or ternary solvent blend of carbon tetrachloride, carbon disulfide, and sulfur dioxide, serving to suppress or eliminate the flash point and the otherwise high flammability of the mixture. Regardless of theory, the addition of the petroleum ether to the above-described mixture does, in fact, produce a synergistic fumigant mixture having an extremely high flash point or one having no flash point.

By way of illustration, the following is a specific example of a fumigant mixture embodying the present invention, wherein the quantities are expressed in percent by weight:

COMPOSITION A

| | |
|---|---|
| Carbon tetrachloride | 81.06 |
| Carbon disulfide | 17.04 |
| Sulfur dioxide | 0.68 |
| Petroleum ether | 1.22 |

Another example of a fumigant embodying the present invention, wherein the quantities are expressed in percent by volume, unless otherwise indicated, is:

COMPOSITION B

| | |
|---|---|
| Carbon tetrachloride | 76.7 |
| Carbon disulfide | 20.4 |
| Petroleum ether | 2.9 |
| Sulfur dioxide ___percent by weight | 1.25 |

The following tables, wherein quantities are expressed in terms of parts by volume, unless otherwise indicated, illustrates varying compositions and their resulting flash points; the expression "flash point" as used herein means the lowest temperature at which the vapors of a liquid may be ignited momentarily by passing a flame over the liquid. Such a test is described in detail in ASTM Standard D92–52 as the so-called "Cleveland Flash Cup" test.

the top of the grain column with a 0.25 ml. Kahn pipette and the pipe is then capped with a tight-fitting cork. Free air space within the pipe containing the wheat kernels is about 800 cc., each pipe containing approximately 2050 cc., or 1486 grams, of wheat. The Table I

| Ingredients | 1 | 2 | 3 | 4 | 5 | 6 |
|---|---|---|---|---|---|---|
| $CCl_4$ | 80 | 90 | 85 | 90 | 76.7 | 79. |
| $CS_2$ | 20 | 10 | 15 | 10 | 20.4 | 21. |
| $SO_2$ | | | 1.25% by wgt. of $CCl_4$ and $CS_2$. | 1.0% by wgt. of $CCl_4$ and $CS_2$ and petrol. ether. | 1.06 grams | |
| Petroleum Ether | | | | 2 | 2.9 | 3. |
| Flash Point | 0° F | 40° F | 48° F | No flash @ 120° F., test discont'd. | No flash @ 142° F., test discont'd. | 78° F. |

It will be noted that compositions 4 and 5, which contain small amounts of petroleum ether, exhibit no flash points up to temperatures which include the boiling points of the mixtures, at which time the tests are discontinued. On the other hand, compositions 1, 2, and 3 exhibit relatively low flash points. Composition 6, containing petroleum ether but no sulfur dioxide, illustrates the effectiveness of petroleum ether in substantially raising the flash point of a binary mixture of carbon tetrachloride and carbon disulfide.

That the effectiveness of petroleum ether as a fumigant additive is not shared by other readily available petroleum derivatives is illustrated by the following:

Table II

| Ingredients | 1 | 2 |
|---|---|---|
| $CCl_4$ | 79 | 79. |
| $CS_2$ | 21 | 21. |
| $SO_2$ | 0.5% to 1.25% by weight. | 0.5% to 1.25% by weight. |
| $C_6H_6$ | | 3. |
| Pet. Ether | 3 | |
| Flash Point | 78° F | No flash @ 120° F., test discontinued. |

The data of Table II indicates that while petroleum ether eliminates flashing up to at least 120° F., at which time the test is discontinued, a similar amount of benzene in an identical mixture raises the flash point to only 78° F.

Varying amounts of fumigants embodying the present invention, when applied to insect-infested grains, exhibit a high killing power, as shown by the following examples:

EXAMPLE I

Tests are conducted using a 2-inch diameter pipe 38 inches long, sealable at both ends, as a test chamber. The pipe is filled with wheat and at 2-inch, 18-inch, and 34-inch depths in the colum are placed small screw-cap vials, 15 x 45 mm., fitted with perforated Bakelite caps, the openings being covered with fine mesh screen. Into each vial are placed 20 adult granary weevils, two to three weeks in adult age, and a 10 mm. height of wheat kernels. The dosage for each fumigant is applied to results of a test exposure period of 24 hours are set forth below:

Granary weevil

| Fumigant Composition | Depth, In. | Percent Mortality [1] (24-hr. exposure)—Dosage/Column | | | |
|---|---|---|---|---|---|
| | | 0.1 ml. | 0.4 ml. | 0.8 ml. | 1.2 ml. |
| A. 85 ml. $CCl_4$—15 ml. $CS_2$—3 ml. Petroleum Ether—1.25% by wgt. $SO_2$ | 2 | 100 | | | |
| | 18 | 75 | 100 | | |
| | 34 | 66 | 23 | 100 | 80 |
| B. 79 ml. $CCl_4$—21 ml. $CS_2$—3 ml. Petroleum Ether—0.68% by wgt. $SO_2$ | 2 | 100 | | | |
| | 18 | 88 | 100 | | |
| | 34 | 63 | 35 | 100 | 96 |
| C. 80 ml. $CCl_4$—20 ml. $CS_2$ | 2 | 100 | | | |
| | 18 | 84 | 100 | | |
| | 34 | 59 | 21 | 93 | 84 |
| D. 80 ml. $CCl_4$—20 ml. $CS_2$—1.25% by wgt. $SO_2$ | 2 | 100 | | | |
| | 18 | 78 | 100 | | |
| | 34 | 45 | 43 | 88 | 94 |

[1] Mortality determined 7 days after insects removed from test column.

Such tests are used to obtain data on relative efficiency with reference to speed of toxic action and penetration and indicate that fumigant mixtures A and B, containing petroleum ether, produce in almost all cases a killing effect greater than is provided by compositions C and D, which contain no petroleum ether.

EXAMPLE II

In a similar manner, tests are conducted to determine the effectiveness of the fumigant on the *Tribolium confusum* (confused flour beetle). In this test, each of the above-mentioned vials is filled with 26-week old adult confused flour beetles and a 10 mm. height of graham flour.

Confused flour beetle

| Fumigant Composition | Depth, In. | Percent Mortality [1] (24-hr. exposure)—Dosage/Column | | | |
|---|---|---|---|---|---|
| | | 0.1 ml. | 0.4 ml. | 0.8 ml. | 1.2 ml. |
| A. 85 ml. $CCl_4$—15 ml. $CS_2$—3 ml. Petroleum Ether—1.25% by wgt. $SO_2$ | 2 | | | | |
| | 18 | 100 | 100 | 100 | |
| | 34 | 23 | 49 | 35 | 100 |
| B. 79 ml. $CCl_4$—21 ml. $CS_2$—3 ml. Petroleum Ether—0.68% by wgt. $SO_2$ | 2 | | | | |
| | 18 | 100 | 100 | 100 | |
| | 34 | 23 | 68 | 61 | 100 |
| C. 80 ml. $CCl_4$—20 ml. $CS_2$ | 2 | 100 | | | |
| | 18 | 29 | 100 | 100 | |
| | 34 | 0 | 23 | 99 | 100 |
| D. 80 ml. $CCl_4$—20 ml. $CS_2$—1.25% by wgt. $SO_2$ | 2 | 100 | | | |
| | 18 | 85 | 100 | 100 | |
| | 34 | 0 | 44 | 50 | 100 |

[1] Mortality determined 7 days after insects removed from test column.

EXAMPLE III

Similar tests are conducted using an exposure period of 72 hours, which simulates practical time exposures. The results of such a test on granary weevils are as follows:

*Granary weevil*

| Fumigant Composition | Percent Mortality (72 hr. exposure)—Dosage/Column | | | | | |
|---|---|---|---|---|---|---|
| | Depth, In. | 0.1 ml.[1] | 0.15 ml.[1] | 0.2 ml.[1] | 0.3 ml.[2] | 0.4 ml.[2] |
| A. 85 ml. CCl₄—15 ml. CS₂—3 ml. Petroleum Ether—1.25% by wgt. SO₂ | 2 | 100 | | | | |
| | 18 | 100 | 100 | | 100 | |
| | 34 | 60 | 60 | 100 | 100 | 100 |
| B. 79 ml. CCl₄—21 ml. CS₂—3 ml. Petroleum Ether—1.06 gms. SO₂ | 2 | 100 | | | | |
| | 18 | 100 | 100 | | 100 | |
| | 34 | 95 | 60 | 100 | 100 | 100 |
| C. 80 ml. CCl₄—20 ml. CS₂ | 2 | 100 | | | | |
| | 18 | 100 | 100 | 100 | 100 | 100 |
| | 34 | 20 | 75 | 55 | 100 | 100 |
| D. 80 ml. CCl₄—20 ml. CS₂—1.25% by wgt. SO₂ | 2 | | | | | |
| | 18 | | 100 | | 100 | |
| | 34 | 95 | 40 | 85 | 100 | 100 |

[1] Mortality determined 14 days after insects removed from test column.
[2] Mortality determined 7 days after insects removed from test column.

Calculated on the basis of 1000 bushels of wheat, a 0.1 ml. dosage is equivalent to 0.485 gallon of fumigant. On this basis, it will be seen that the amount of composition B necessary to give a 100% kill of granary weevil adults, fumigated for three days, is approximately one gallon, while approximately 1.5 gallons of compositions C or D are required to accomplish the same result.

In practice, fumigants of the present invention may be employed by sprinkling, spraying, or pouring the fumigant over the grain, seed, or other material to be fumigated in amounts typically ranging from about 0.5 gallon to 7.5 gallons per 1000 bushels. The extremely low flammability or lack of flammability of compositions of the present invention permit safe handling and substantially eliminate fire hazard in the fumigation operation.

EXAMPLE IV

Similar three-day fumigation tests at 0.3 ml. dosage for control of rice weevil, red flour beetle, and cadelle (*Tenebroides mauritanicus*) in which the test column is filled with wheat give the following results:

| Fumigant Composition | Percent Mortality [1] | | | |
|---|---|---|---|---|
| | Depth, In. | Rice Weevil | Red Flour Beetle | Cadelle |
| 79 ml. CCl₄—21 ml. CS₂—3 ml. Petroleum Ether—0.68% by wgt. SO₂ | 2 | | | |
| | 18 | | | |
| | 34 | 100 | 100 | 100 |
| 80 ml. CCl₄—20 ml. CS₂ | 2 | | | |
| | 18 | | | |
| | 34 | 100 | 100 | 95 |

[1] Mortality determined 7 days after insects removed from test column.

While the foregoing description is particularly directed to the fumigation of grain and related products, it is to be understood that the novel fumigant products of the present invention also may be employed in household fumigation, vault fumigation and the like wherever a highly effective toxicant material is required.

While there have been described various embodiments of the invention, the methods and products described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What we claim is:

1. A fumigant composition consisting essentially of a mixture of carbon tetrachloride as a major constituent, a lesser amount of carbon disulfide, and minor amounts of sulfur dioxide and petroleum ether.

2. A fumigant composition consisting essentially of a major proportion of carbon tetrachloride, a lesser proportion of carbon disulfide, and minor amounts of sulfur dioxide and petroleum ether, said petroleum ether being added in a small but effective amount sufficient to reduce the flammability of the resultant mixture.

3. The method of fumigating an insect-infested material and space, said method comprising contacting said material and space with a mixture of a major proportion of carbon tetrachloride, a lesser proportion of carbon disulfide, and minor amounts of sulfur dioxide and petroleum ether.

4. The method of preparing a substantially non-flammable toxic fumigant comprising the steps of mixing a major proportion of carbon tetrachloride with a lesser proportion of carbon disulfide and a minor amount of petroleum ether, thereafter passing sulfur dioxide through the resultant mixture to incorporate sufficient sulfur dioxide in said mixture to impart a high degree of non-flammability thereto.

5. A fumigant composition consisting essentially of the following ingredients wherein the proportions indicated are in percent by weight:

Carbon tetrachloride _____ 84.6
Carbon disulfide _____ 14.0
Sulfur dioxide _____ 1.0
Petroleum ether (40°–60° C. boiling range) _____ 0.4

6. A fumigant composition consisting essentially of the following ingredients wherein the proportions indicated are in percent by volume:

Carbon tetrachloride _____ 81.0
Carbon disulfide _____ 16.9
Sulfur dioxide _____ 1.1
Petroleum ether (40°–60° C. boiling range) _____ 1.0

7. A fumigant composition consisting essentially of the following ingredients wherein the proportions indicated are in percent by volume:

Carbon tetrachloride _____ 80.0 to 82.0
Carbon disulfide _____ 15.8 to 18.0
Sulfur dioxide _____ 0.5 to 1.1
Petroleum ether _____ 0.5 to 1.5

8. A fumigant composition consisting essentially of the following ingredients wherein the proportions indicated are in percent by volume:

| | |
|---|---|
| Carbon tetrachloride | 82.6 to 81.8 |
| Carbon disulfide | 16.1 to 17.3 |
| Sulfur dioxide | 0.7 to 1.1 |
| Petroleum ether | 0.8 to 1.2 |

9. A fumigant composition consisting essentially of a solution comprising at least 78 parts by volume carbon tetrachloride, up to 22 parts by volume carbon disulfide, up to 1.5% by weight of the other constituents, sulfur dioxide, and up to 3% by volume of the other constituents, petroleum ether.

References Cited in the file of this patent

UNITED STATES PATENTS

| | | |
|---|---|---|
| 1,316,191 | Sadtler | Sept. 16, 1919 |
| 1,649,254 | Roark | Nov. 15, 1927 |

OTHER REFERENCES

Moore: J. Agr. Res., vol. 10, No. 7, August 13, 1917, pp. 365–371.

Roark: U. S. Dept. Agr. Bull. No. 162, March 1929, pp. 49–51.

Balock: J. Econ. Ento., vol. 44, No. 5, October 1951, pp. 657–659.

Brown: Insect Control by Chem., 1951, pp. 37 and 39–41 pert.

Brown: Insect Control by Chem., 1951, p. 38.

Roark: U. S. Dept. of Agr., 1929, Tech. Bull., No. 162, p. 4.